US012696067B2

(12) United States Patent
Höglund et al.

(10) Patent No.: US 12,696,067 B2
(45) Date of Patent: Jul. 28, 2026

(54) OPTIMIZATION OF PLMN SELECTION FOR POWER SAVING

(71) Applicant: Telefonaktiebolaget LM Ericsson (publ), Stockholm (SE)

(72) Inventors: Andreas Höglund, Solna (SE); Olof Liberg, Enskede (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 314 days.

(21) Appl. No.: 18/572,503

(22) PCT Filed: Jun. 22, 2022

(86) PCT No.: PCT/SE2022/050618
§ 371 (c)(1),
(2) Date: Dec. 20, 2023

(87) PCT Pub. No.: WO2022/271072
PCT Pub. Date: Dec. 29, 2022

(65) Prior Publication Data
US 2024/0298164 A1 Sep. 5, 2024

Related U.S. Application Data

(60) Provisional application No. 63/214,595, filed on Jun. 24, 2021.

(51) Int. Cl.
H04W 8/00 (2009.01)
H04W 36/32 (2009.01)
H04W 84/04 (2009.01)

(52) U.S. Cl.
CPC ......... H04W 8/005 (2013.01); H04W 36/322 (2023.05); H04W 36/324 (2023.05); H04W 84/042 (2013.01)

(58) Field of Classification Search
CPC ..... H04W 8/005; H04W 40/24; H04W 48/10; H04W 48/16; H04W 48/18; H04W 36/32;
(Continued)

(56) References Cited

U.S. PATENT DOCUMENTS

| | | | |
|---|---|---|---|
| 2010/0020725 A1* | 1/2010 | Ha | H04W 48/16 370/255 |
| 2015/0056985 A1 | 2/2015 | Swaminathan et al. | |

(Continued)

FOREIGN PATENT DOCUMENTS

| | | |
|---|---|---|
| CN | 109451560 B | 12/2020 |
| EP | 2148540 A2 | 1/2010 |
| EP | 3442275 A1 | 2/2019 |

OTHER PUBLICATIONS

3rd Generation Partnership Project, "3rd Generation Partnership Project; Technical Specification Group Core Network and Terminals; Non-Access-Stratum (NAS) functions related to Mobile Station (MS) in idle mode (Release 17)", Technical Specification, 3GPP TS 23.122 V17.2.0, 2021-03, pp. 1-94, 3GPP.
(Continued)

*Primary Examiner* — Brian T Le
(74) *Attorney, Agent, or Firm* — COATS & BENNETT, PLLC

(57) ABSTRACT

A terminal device (110) in a wireless communication network connects (210) to a Visited Public Land Mobile Network. VPLMN (140) and, while connected to the VPLMN (140), searches (220) for a Home Public Land Mobile Network, HPLMN (130) each time any of a plurality of timers expires. The searching comprises searching (225) across a plurality of frequency bands supported by the terminal device (110) in response to a first timer expiring and searching (227) across a subset of the plurality of frequency bands supported by the terminal device (110) in response to
(Continued)

a second timer expiring. The terminal device may be configured by a base station to perform the searching.

16 Claims, 15 Drawing Sheets

(58) Field of Classification Search
CPC ............. H04W 36/322; H04W 36/324; H04W 36/326; H04W 84/042; H04L 41/5058; H04L 41/0833; H04L 67/51; H04L 67/75; H04L 67/12; H04L 69/28; Y02D 30/70
See application file for complete search history.

(56) References Cited

U.S. PATENT DOCUMENTS

2017/0078865 A1*   3/2017   Santhanam ............. H04L 5/001
2019/0045424 A1*   2/2019   Rune ................. H04W 52/0229

OTHER PUBLICATIONS

Nokia et al., "Revised WID on support of reduced capability NR devices", 3GPP TSG RAN Meeting #91e, Electronic Meeting, Mar. 22-26, 2021, pp. 1-6, RP-210918, 3GPP.

3rd Generation Partnership Project, "3rd Generation Partnership Project; Technical Specification Group Radio Access Network; Evolved Universal Terrestrial Radio Access (E-UTRA); User Equipment (UE) radio access capabilities (Release 16)", Technical Specification, 3GPP TS 36.306 V16.4.0, Mar. 2021, pp. 1-146, 3GPP.

3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 16)", Technical Specification, 3GPP TS 36.304 V16.3.0, Dec. 2020, pp. 1-64, 3GPP.

3rd Generation Partnership Project, "3rd Generation Partnership Project; Technical Specification Group Core Network and Terminals; Characteristics of the Universal Subscriber Identity Module (USIM) application (Release 17)", Technical Specification, 3GPP TS 31.102 V17.1.0, Mar. 2021, pp. 1-327, 3GPP.

3rd Generation Partnership Project, "3rd Generation Partnership Project; Technical Specification Group Core Network and Terminals; Non-Access-Stratum (NAS) protocol for 5G System (5GS); Stage 3; (Release 17)", Technical Specification, 3GPP TS 24.501 V17.2.1, Apr. 2021, pp. 1-757, 3GPP.

3rd Generation Partnership Project,"3rd Generation Partnership Project; Technical Specification Group Core Network and Terminals; Non-Access Stratum (NAS) configuration Management Object (MO) (Release 16)", Technical Specification, 3GPP TS 24.368 V16.6.0, Mar. 2021, pp. 1-43, 3GPP.

3rd Generation Partnership Project, "3rd Generation Partnership Project; Technical Specification Group Core Network and Terminals; Non-Access-Stratum (NAS) protocol for Evolved Packet System (EPS); Stage 3 (Release 17)", Technical Specification, 3GPP TS 24.301 V17.2.0, Mar. 2021, pp. 1-588, 3GPP.

3rd Generation Partnership Project, "3rd Generation Partnership Project; Technical Specification Group Core Network and Terminals; Mobile radio interface Layer 3 specification; Core network protocols; Stage 3 (Release 17)", Technical Specification, 3GPP TS 24.008 V17.2.0, Mar. 2021, pp. 1-798, 3GPP.

3rd Generation Partnership Project, "3rd Generation Partnership Project; Technical Specification Group Services and System Aspects; Architecture enhancements to facilitate communications with packet data networks and applications (Release 16)", Technical Specification, 3GPP Ts 23.682 V16.9.0, Mar. 2021, pp. 1-135, 3GPP.

3rd Generation Partnership Project, "3rd Generation Partnership Project; Technical Specification Group Services and System Aspects; Multimedia Broadcast/Multicast Service (MBMS); Architecture and functional description (Release 16)", Technical Specification, 3GPP TS 23.246 V16.1.0, Sep. 2019, pp. 1-77, 3GPP.

3rd Generation Partnership Project, "3rd Generation Partnership Project; Technical Specification Group Radio Access Network; Study on support of reduced capability NR devices (Release 17)", Technical Report, 3GPP TR 38.875 V17.0.0, Mar. 2021, pp. 1-86, 3GPP.

* cited by examiner

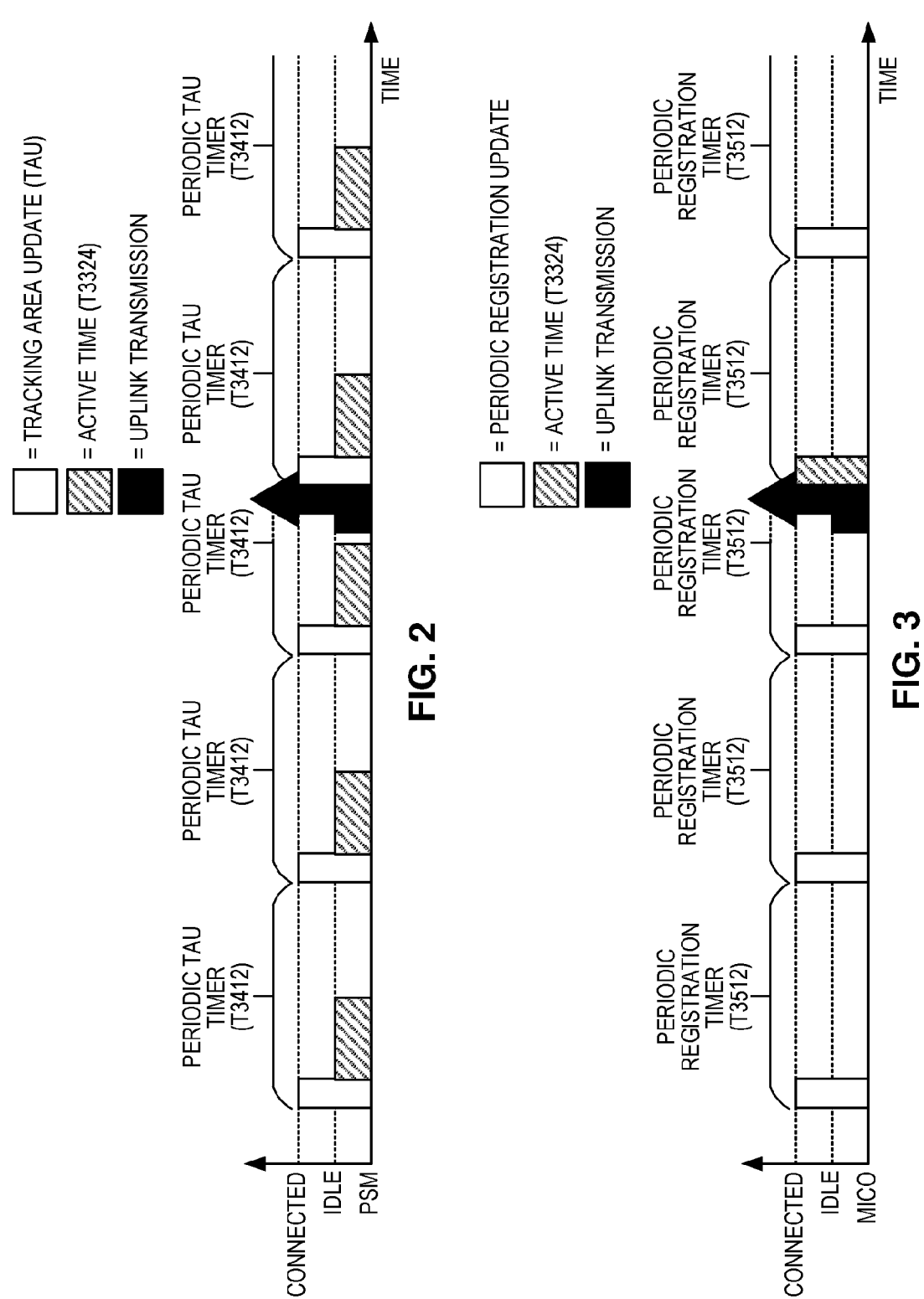

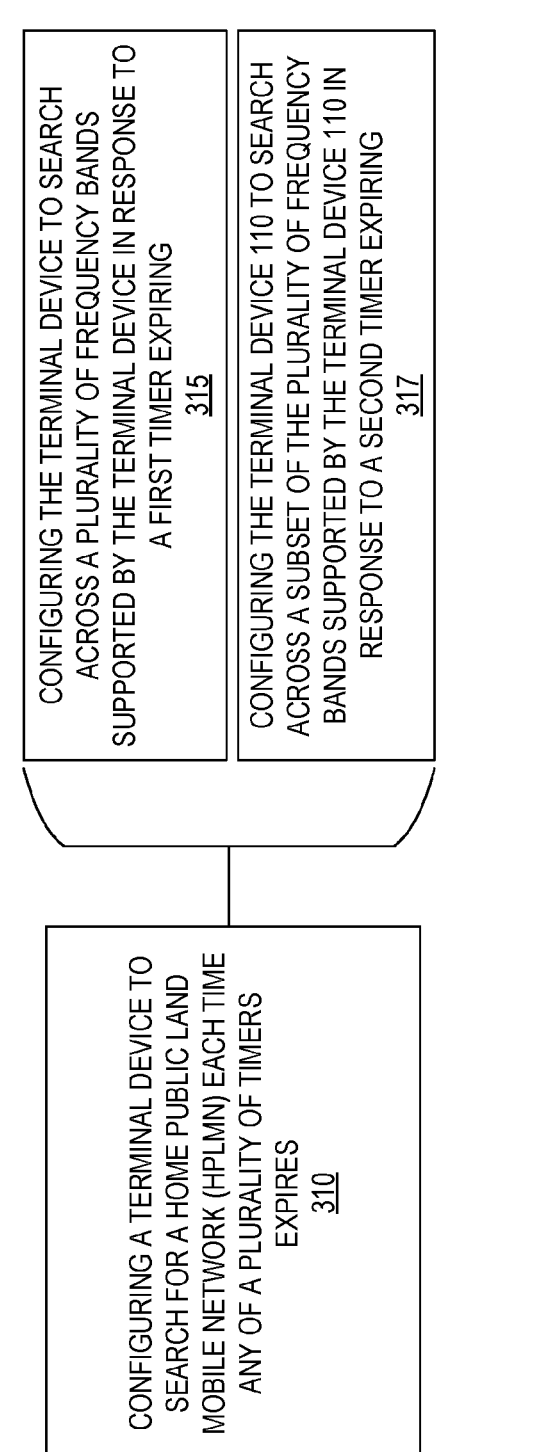

CONFIGURING A TERMINAL DEVICE TO SEARCH FOR A HOME PUBLIC LAND MOBILE NETWORK (HPLMN) EACH TIME ANY OF A PLURALITY OF TIMERS EXPIRES
310

CONFIGURING THE TERMINAL DEVICE TO SEARCH ACROSS A PLURALITY OF FREQUENCY BANDS SUPPORTED BY THE TERMINAL DEVICE IN RESPONSE TO A FIRST TIMER EXPIRING
315

CONFIGURING THE TERMINAL DEVICE 110 TO SEARCH ACROSS A SUBSET OF THE PLURALITY OF FREQUENCY BANDS SUPPORTED BY THE TERMINAL DEVICE 110 IN RESPONSE TO A SECOND TIMER EXPIRING
317

TERMINAL DEVICE (E.G. UE, MS) 110

INTERFACE CIRCUITRY
930

PROCESSING CIRCUITRY
910

MEMORY CIRCUITRY
920

PROGRAM
940

BEGIN

1710
Host computer provides
user data

1720
Host computer initiates
transmission carrying the
user data to the UE

1730
UE receives the user data

END

OPTIMIZATION OF PLMN SELECTION FOR POWER SAVING

RELATED APPLICATIONS

The present application claims the benefit of U.S. Provisional Application No. 63/214,595, which was filed Jun. 24, 2021, the entire disclosure of which is hereby incorporated by reference.

TECHNICAL FIELD

The present disclosure is generally directed to the technical field of wireless communication networks and, more particularly, to the efficient selection Public Land Mobile Networks (PLMN), e.g., to reduce device energy consumption and/or enable longer battery life.

BACKGROUND 5G is the fifth generation of cellular technology and was introduced in Release 15 (Rel-15) of the Third Generation Partnership Project (3GPP) standard. It is designed to increase speed, reduce latency, and improve flexibility of wireless services. The 5G system (5GS) includes both a Next Generation Radio Access Network (NG-RAN) which makes use of a new air interface called New Radio (NR), and a new core network (5GC).

The initial release of 5G in Rel-15 is optimized for mobile broadband (MBB) and ultra-reliable low latency communication (URLLC). These services generally require very high data rates and/or low latency and therefore put high requirements on mobile terminals (sometimes alternatively referred to herein as User Equipment (UEs), Mobile Stations (MSs), or Wireless Devices (WDs)). To enable 5G to be used for other services having more relaxed performance requirements, a new, low complexity UE type called a "reduced capability NR device" or "RedCap" was introduced in Release 17 (Rel-17). The low complexity UE type is particularly suited for Machine Type Communication (MTC) services such as wireless sensors or video surveillance, but it can also be used for MBB services with lower performance requirements such as wearables. The low complexity UE has reduced capabilities compared to a Release 15 NR UE, including reduced UE bandwidth, reduced number of UE Receive/Transmit (RX/TX) antennas, and half-duplex frequency division duplexing (FDD). Because of the reduced capabilities, the low complexity UE is sometimes also referred to as an NR RedCap UE. An NR RedCap UE may have some or all of the reduced capabilities above.

SUMMARY

Embodiments of the present disclosure are generally directed to enabling efficient PLMN search and/or selection procedures, e.g., to reduce device energy consumption and/or enable longer battery life.

Particular embodiments include a method implemented by a terminal device in a wireless communication network. The method comprises connecting to a Visited Public Land Mobile Network (VPLMN). The method further comprises, while connected to the VPLMN, searching for a Home Public Land Mobile Network (HPLMN) each time any of a plurality of timers expires. The searching comprises searching across a plurality of frequency bands supported by the terminal device in response to a first timer expiring. The searching further comprises searching across a subset of the plurality of frequency bands supported by the terminal device in response to a second timer expiring.

In some embodiments, the subset of the plurality of frequency bands comprises more than one frequency band, and the searching further comprises searching across one frequency band supported by the terminal device in response to a third timer expiring. In some such embodiments, searching across the one frequency band supported by the terminal device in response to the third timer expiring comprises searching a last known frequency band supported by the HPLMN.

In some embodiments, the method further comprises adjusting one or more of the timers based on an extent to which the terminal device is mobile. In some such embodiments, adjusting the one or more of the timers based on the extent to which the terminal device is mobile comprises shortening or lengthening at least one of the timers based respectively on whether a mobility of the terminal device has increased or decreased.

In some embodiments, the method further comprises reporting to the wireless communication network that the searching for the HPLMN using the plurality of timers is supported by the terminal device, and in response, receiving signaling from the wireless communication network configuring the terminal device to enable the searching for the HPLMN using the plurality of timers.

In some embodiments, the method further comprises adjusting one or more of the timers based on distance from the terminal device to a geographic location. In some such embodiments, adjusting the one or more of the timers based on the distance to the geographic location comprises shortening or lengthening at least one of the timers based respectively on whether the distance from the terminal device to the geographic location has decreased or increased, the geographic location being a location associated with having HPLMN coverage.

In some embodiments, the method further comprises searching for the HPLMN in response to detecting a change in geographic area. In some such embodiments, searching for the HPLMN in response to detecting the change in geographic area comprises searching for the HPLMN on a frequency band last used with the HPLMN in response to entering an area associated with HPLMN coverage. Additionally or alternatively, in some such embodiments, detecting the change in geographic area comprises using a wake-up receiver to detect a wake-up signal transmitted by a base station associated with the geographic area.

In some embodiments, the method further comprises entering a power saving state while connected to the VPLMN, and leaving the power saving state to perform the searching.

Other embodiments include a terminal device comprising processing circuitry and a memory. The memory contains instructions executable by the processing circuitry whereby the terminal device is configured to connect to a Visited Public Land Mobile Network (VPLMN). The terminal device is further configured to, while connected to the VPLMN, search for a Home Public Land Mobile Network (HPLMN) each time any of a plurality of timers expires. To search for the HPLMN, the terminal device is configured to search across a plurality of frequency bands supported by the terminal device in response to a first timer expiring. To search for the HPLMN, the terminal device is also configured to search across a subset of the plurality of frequency bands supported by the terminal device in response to a second timer expiring.

In some embodiments, the terminal device is further configured to perform any of the methods described above.

Other embodiments include a computer program, comprising instructions which, when executed on processing circuitry of a terminal device, cause the terminal device to carry out any of the methods described above with respect to a terminal device.

Yet other embodiments include a carrier containing such a computer program. The carrier is one of an electronic signal, optical signal, radio signal, or computer readable storage medium.

Other embodiments include a method implemented by a base station in a wireless communication network. The method comprises configuring a terminal device to search for a Home Public Land Mobile Network (HPLMN) each time any of a plurality of timers expires. The configuring comprises configuring the terminal device to search across a plurality of frequency bands supported by the terminal device in response to a first timer expiring. The configuring further comprises configuring the terminal device to search across a subset of the plurality of frequency bands supported by the terminal device in response to a second timer expiring.

In some embodiments, configuring the terminal device to search for the HPLMN each time any of the plurality of timers expires further comprises configuring the terminal device to search for the HPLMN while the terminal device is connected to a Visited Public Land Mobile Network (VPLMN).

In some embodiments, the method further comprises the subset of the plurality of frequency bands comprises more than one frequency band. Configuring the terminal device to search for the HPLMN each time any of the plurality of timers expires further comprises configuring the terminal device to search across one frequency band supported by the terminal device in response to a third timer expiring. In some such embodiments, configuring the terminal device to search across the one frequency band supported by the terminal device in response to the third timer expiring comprises configuring the terminal device to search a last known frequency band supported by the HPLMN.

In some embodiments, the method further comprises configuring the mobile terminal to adjust one or more of the timers based on an extent to which the terminal device is mobile. In some such embodiments, configuring the mobile terminal to adjust the one or more of the timers based on the extent to which the terminal device is mobile comprises configuring the mobile terminal to shorten or lengthen at least one of the timers based respectively on whether a mobility of the terminal device has increased or decreased.

In some embodiments, configuring the terminal device to search for the HPLMN each time any of the plurality of timers expires is responsive to receiving a report from the terminal device. The report indicates that searching for the HPLMN using the plurality of timers is supported by the terminal device.

In some embodiments, the method further comprises configuring the terminal device to adjust one or more of the timers based on distance from the terminal device to a geographic location. In some such embodiments, configuring the terminal device to adjust the one or more of the timers based on the distance to the geographic location comprises configuring the terminal device to shorten or lengthen at least one of the timers based respectively on whether the distance from the terminal device to the geographic location has decreased or increased, the geographic location being a location associated with having HPLMN coverage.

In some embodiments, the method further comprises configuring the terminal device to search for the HPLMN in response to the terminal device detecting a change in geographic area. In some such embodiments, configuring the terminal device to search for the HPLMN in response to detecting the change in geographic area comprises configuring the terminal device to search for the HPLMN on a frequency band last used with the HPLMN in response to the terminal device entering an area associated with HPLMN coverage.

In some embodiments, the method further comprises transmitting a wake-up signal configured to trigger the terminal device to search for the HPLMN.

Yet other embodiments include a base station comprising processing circuitry and a memory. The memory contains instructions executable by the processing circuitry whereby the base station is configured to configure a terminal device to search for a Home Public Land Mobile Network (HPLMN) each time any of a plurality of timers expires. To configure the terminal device, the base station is configured to configure the terminal device to search across a plurality of frequency bands supported by the terminal device in response to a first timer expiring. To configure the terminal device, the base station is further configured to configure the terminal device to search across a subset of the plurality of frequency bands supported by the terminal device in response to a second timer expiring.

In some embodiments, the base station is further configured to perform any of the methods described above with respect to a base station.

Other embodiments include a computer program, comprising instructions which, when executed on processing circuitry of a base station, cause the base station to carry out any of the methods described above with respect to a base station.

Yet other embodiments include a carrier containing such a computer program. The carrier is one of an electronic signal, optical signal, radio signal, or computer readable storage medium.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a base station 120, generally, as opposed to discussion of particular instances of base stations 120a, 120b).

FIGS. 2 and 3 are timeline graphs illustrating examples of state transitions performed by a terminal device over time, according to one or more embodiments of the present disclosure.

FIG. 5 is a flow diagram illustrating an example method implemented by a base station, according to one or more embodiments of the present disclosure.

DETAILED DESCRIPTION

Figure 1:
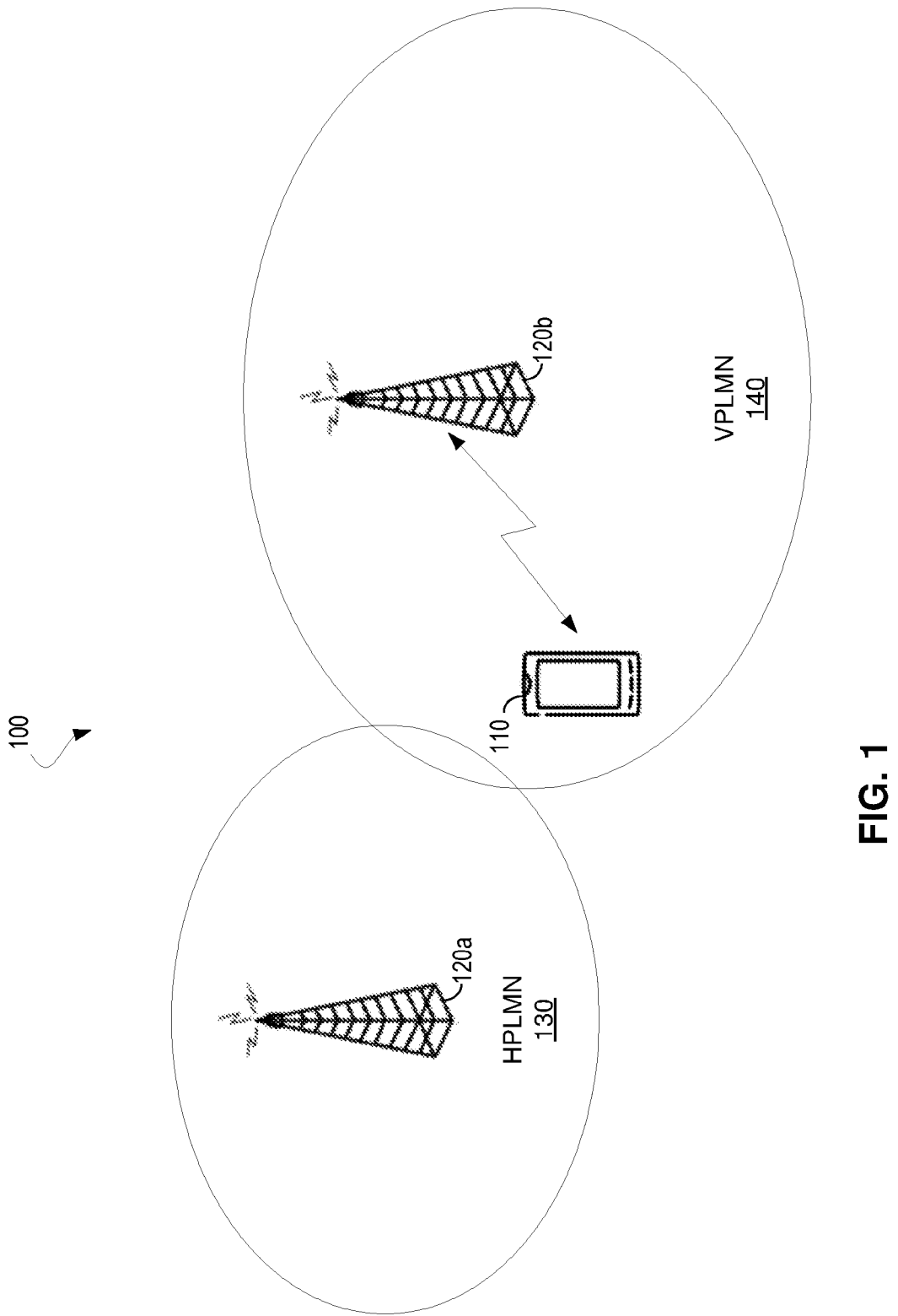
FIG. 1 is a schematic diagram illustrating an example wireless network environment, according to one or more embodiments of the present disclosure.

FIG. 1 is a schematic diagram illustrating an example network environment 100 according to one or more embodiments of the present disclosure. The network environment 100 includes a Home Public Land Mobile Network (HPLMN) 130, a Visited PLMN (VPLMN) 140, and a terminal device 110. Each of the PLMNs 130, 140 comprises at least one base station 120*a*, 120*b* that is capable of providing the terminal device 110 with radio access. In the example of FIG. 1, the terminal device 110 is connected to the base station 120*b* in the VPLMN 140.

According to existing 3GPP standards, a terminal device 110 in the RRC_IDLE or RRC_INACTIVE state is required to perform PLMN selection. During PLMN selection, a terminal device 110 is expected to scan all of its supported frequency bands in the search for PLMNs. The terminal device 110 may also use stored information for optimizing its search over the supported frequencies for PLMNs.

Among the identified PLMNs the terminal device 110 is traditionally required to select the PLMN of highest priority. Also, if necessary, the terminal device 110 is traditionally required to search for higher priority PLMNs. A terminal device 110 is normally expected to operate on its HPLMN 130 or equivalent HPLMN (EHPLMN), but a VPLMN 140 may be selected if any of the former are not in coverage. If the terminal device 110 cannot find any HPLMN 130 or EHPLMN, and is in a VPLMN 140, it will attempt to find its HPLMN 130 (or EHPLMN) with a periodicity T. More specifically, if the terminal device 110 is in a VPLMN, the terminal device 110 is traditionally expected to periodically attempt to obtain service on its HPLMN 130 (if the EHPLMN list is not present or is empty) or one of its EHPLMNs (if the EHPLMN list is present) or a higher priority PLMN/access technology combination listed in "user controlled PLMN selector" or "operator controlled PLMN selector" by scanning in accordance with the requirements that are applicable as defined in the Automatic Network Selection Mode in subclause 4.4.3.1.1 of 3GPP TS 23.122. Should the terminal device 110 have a stored "Equivalent PLMNs" list, the terminal device 110 shall only select a PLMN if it is of a higher priority than those of the same country as the current serving PLMN which are stored in the "Equivalent PLMNs" list. For this purpose, a value of timer T may be stored in the Subscriber Identification Module (SIM). The interpretation of the stored value depends on the radio capabilities supported by the terminal device 110.

For a terminal device 110 that does not support any of Extended Coverage (EC) Global System for Mobile Communications (GSM) Internet of Things (IoT) (EC-GSM-IoT), Category M1, or Category NB1 (as defined in 3GPP TS 36.306), T is either in the range of 6 minutes to 8 hours (in 6 minute steps), or it indicates that no periodic attempts shall be made. If no value for T is stored in the SIM, a default value of 60 minutes is used for T.

For a terminal device 110 that only supports any (or a combination of) EC-GSM-IoT, Category M1, or Category NB1 (as defined in 3GPP TS 36.306), T is either in the range of 2 hours to 240 hours (using 2 hour steps from 2 hours to 80 hours and 4 hour steps from 84 hours to 240 hours), or it indicates that no periodic attempts shall be made. If no value for T is stored in the SIM, a default value of 72 hours is used.

For a terminal device 110 that supports any (or a combination of) EC-GSM-IoT, Category M1, or Category NB1 (as defined in 3GPP TS 36.306), as well as any access technology other than EC-GSM-IoT, Category M1, and Category NB1 (as defined in 3GPP TS 36.306), then the value of T is interpreted depending on the access technology in use. More particularly, the value of T traditionally depends on whether or not the terminal device 110 is using EC-GSM-IoT, Category M1, or Category NB1 (as defined in 3GPP TS 36.306) at the time of starting timer T.

If the terminal device 110 is using any of said access technologies, T is either in the range 2 hours to 240 hours (using 2 hour steps from 2 hours to 80 hours and 4 hour steps from 84 hours to 240 hours) or it indicates that no periodic attempts shall be made. If no value for T is stored in the SIM, a default value of 72 hours is used. If the terminal device 110 is not using any of the aforesaid access technologies, T is either in the range 6 minutes to 8 hours in 6 minute steps or it indicates that no periodic attempts shall be made. If no value for T is stored in the SIM, a default value of 60 minutes is used for T.

If the terminal device 110 is configured with the MinimumPeriodicSearchTimer parameter as specified in 3GPP TS 24.368 or 3GPP TS 31.102, the terminal device 110 is generally required not to use a value for T that is less than the MinimumPeriodicSearchTimer. If the value stored in the SIM, or the default value for T (when no value is stored in the SIM), is less than the MinimumPeriodicSearchTimer, then T is set to the MinimumPeriodicSearch Timer.

The terminal device 110 does not stop timer T as described in 3GPP TS 24.008 and 3GPP TS 24.301 when it activates Power Saving Mode (PSM) or Mobile Initiated Connection Only Mode (MICO) as described in 3GPP TS 24.501. The terminal device 110 can be configured for Fast First Higher Priority PLMN search as specified in 3GPP TS 31.102 or 3GPP TS 24.368. Fast First Higher Priority PLMN search is enabled if the corresponding configuration parameter is present and set to enabled. Otherwise, Fast First Higher Priority PLMN search is disabled.

Traditionally, attempts to access the HPLMN 130 or an EHPLMN or higher priority PLMN are subject to a variety of requirements. For example, periodic attempts are generally required to only be performed in automatic mode when the terminal device 110 is roaming, and not while the terminal device 110 is attached for emergency bearer services, is registered for emergency services, has a Packet Data Unit (PDU) session for emergency services or has a Packet Data Network (PDN) connection for emergency bearer services.

The terminal device 110 is also generally required to make the first attempt after a period of at least 2 minutes and at most T minutes: a) only after switch on if Fast First Higher Priority PLMN search is disabled; or b) after switch on or upon selecting a VPLMN if Fast First Higher Priority PLMN search is enabled. The terminal device 110 is generally required to make subsequent attempts if the terminal device 110 is on the VPLMN 140 at time T after the last attempt.

Periodic attempts are generally required to only be performed by the terminal device 110 while in idle mode or in 5GMM-CONNECTED mode with a Radio Resource Control (RRC) inactive indication. That said, periodic attempts may be postponed in a variety of situations. For example, periodic attempts may be postponed while the terminal device 110 is in power saving mode (PSM), while the terminal device 110 is receiving eMBMS transport service in idle mode, until the next Extended Discontinuous Reception (eDRX) occasion while the terminal device 110 is configured with eDRX, while the terminal device 110 is in relaxed monitoring, and/or while the terminal device 110 is in MICO.

If the HPLMN 130 (if the EHPLMN list is not present or is empty) or an EHPLMN (if the list is present) or a higher priority PLMN is not found, the terminal device 110 is generally required to remain on the VPLMN, and may be required to limit its attempts to access a higher priority PLMN/access technology combination to PLMN/access technology combinations of the same country as the current serving VPLMN. Only the priority levels of Equivalent PLMNs of the same country as the current serving VPLMN (as defined in the 3GPP standard) and which are not in the list of "PLMNs where registration was aborted due to Steering of Roaming (SOR)" (i.e., if the terminal device 110 has a list of "PLMNs where registration was aborted due to SOR") are taken into account to compare with the priority level of a selected PLMN. If the PLMN of the highest priority PLMN/access technology combination available is the current VPLMN, or one of the PLMNs in the "Equivalent PLMNs" list and is not in the list of "PLMNs where registration was aborted due to SOR" (i.e., if the terminal device 110 has such a list), the terminal device 110 shall remain on the current PLMN/access technology combination. Further, in some scenarios, the terminal device 110 shall consider PLMNs which are in the list of "PLMNs where registration was aborted due to SOR" as lowest priority (again, if the terminal device 110 has such a list).

In certain use cases, terminal devices 110 are expected to frequently move between the HPLMN 130 and the VPLMN 140. One example includes sensors and/or actuators on vehicles and/or workers in a factory hall. During working hours, the terminal devices 110 may camp on a HPLMN 130 provided by a dedicated network covering the factory hall. During off-working hours, the terminal devices 110 may be outside of the factory and expected to camp on a public network which acts as a VPLMN for the terminal devices 110.

For the terminal devices 110 to quickly resume their functionality when on the factory premises, they currently need to be configured with a short HPLMN search time (T). However, it is often power consuming to facilitate a short T because this causes the terminal devices 110 to frequently search for its HPLMN 130 when outside the factory in a VPLMN 140. The search traditionally causes the terminal devices 110 to frequently scan all its supported frequency bands, which leads to high energy consumption and depletes the battery during non-working hours.

A long search timer T would reduce power consumption when the terminal device 110 is in VPLMN. However, this would also lead to high latency. Thus, the sensor/actuators may not be operational in the HPLMN as desired for a time T after the start of the working hours once back in the factory.

Previous approaches to saving power in a terminal device 110 have traditionally focused on placing the terminal device 110 into PSM during times when the terminal device 110 is not expected to need to exchange data. PSM was introduced in LTE Release 12 (Rel-12) and is a feature that can generally provide long battery life for terminal devices 110 with infrequent data exchange and no need for quick downlink reachability. PSM works by keeping the terminal device 110, most of the time, in a sub-state of RRC_IDLE that is more power efficient and in which all Access Stratum (AS) functionality is switched off. This sub-state can effectively be thought of as a deep sleep (and almost a power-off) but without the need to re-attach to the network. After a connection, the terminal device 110 is sent to this power saving state after a certain time in RRC_IDLE mode. A configurable parameter controls the amount of time the terminal device 110 spends in RRC_IDLE (i.e., in active time) before the terminal device 110 enters the power saving state, and the terminal device 110 tracks this idle time using timer T3324. The terminal device 110 returns from this power saving state either upon needing to make an uplink data transmission or periodic Tracking Area Update (TAU). The amount of time between TAUs is tracked using timer T3412.

FIG. 2 is a timeline illustrating an example of state transitions performed by a terminal device 110 over time. As shown in FIG. 2, the terminal device may be in PSM, may be idle (e.g., in the RRC_IDLE state), or may be connected (e.g., in the RRC_CONNECTED state). As can be seen in FIG. 2, the terminal device 110 is in PSM most of the time, but is reachable in the downlink by the network after an uplink transmission during an active time window tracked using T3324. As shown in FIG. 2, the uplink transmission resets T3412 before expiration.

The terminal device 110 is also reachable periodically, i.e., when a periodic TAU occurs after an interval of time tracked by the T3412. This periodic TAU, in certain respects, acts as "keep-alive" uplink control signaling, and provides a window for downlink reachability even if there are no mobile-originated uplink transmissions to be made.

NR provides a similar power saving feature called MICO, which is similar to PSM but includes some additional options. MICO is a Core Network (CN) feature described in 3GPP Technical Specification (TS) 23.501 Service Aspects 2 (SA2) and 24.501 Core Network and Terminals 1 (CT1). In NR, the terminal device 110 can indicate a preference to use MICO mode during registration, and the Access and Mobility Management Function (AMF) of the CN can configure the use of MICO mode through use of the MICO indication Information Element (IE) (i.e. during Non-Access Stratum (NAS) negotiation).

FIG. 3 is a timeline illustrating an example of state transitions performed by a terminal device 110 over time using MICO. MICO is like PSM but is triggered by "periodic registration timer" (T3512) instead of a periodic TAU timer (T3412). T3512 may therefore be used for downlink reachability. The periodic registration timer (T3512) is stopped and restarted when the terminal device 110 enters the CM-CONNECTED state. The 'Periodic Registration Timer' (T3512), and 'Active Time' (T3324), can take values from 2 seconds to 310 hours (i.e., approximately 13 days).

In contrast to previous general approaches to power savings in which a single timer has been used to periodically enable the terminal device 110 to be reachable, embodiments of the present disclosure configure a terminal device 110 with multiple timers for PLMN selection, each being associated with a gradually decreasing frequency range compared to the full set of bands supported by the terminal device that are typically expected to be scanned during the HPLMN search in the out-of-coverage scenario. Additionally or alternatively, a change in terminal device location may be used to trigger the use of a different PLMN search timer or to directly trigger a PLMN search. Among other things, such embodiments may allow terminal devices to frequently roam between an HPLMN 130 and a VPLMN 140 with limited impact on power consumption due to PLMN searching, while nonetheless maintaining a short HPLMN search periodicity.

Figure 4:
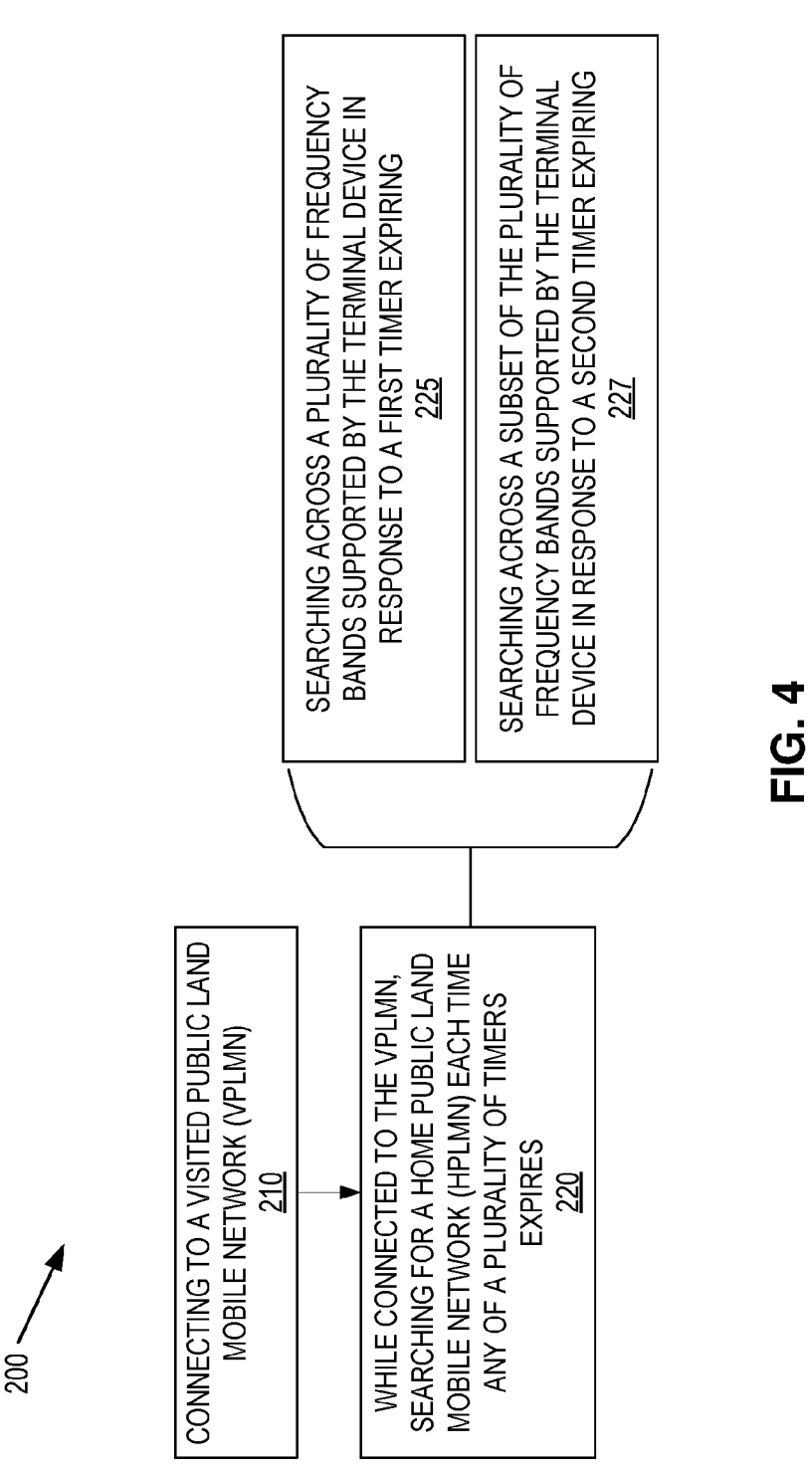
FIG. 4 is a flow diagram illustrating an example method implemented by a terminal device, according to one or more embodiments of the present disclosure.

Particular embodiments include a method 200 as shown in the flow diagram of FIG. 4. The method 200 is implemented by a terminal device 110. The method 200 comprises connecting to a Visited Public Land Mobile Network (VPLMN) 140 (block 210). The method 200 further comprises, while connected to the VPLMN 140, searching for a Home Public Land Mobile Network (HPLMN) 130 each time any of a plurality of timers expires (block 220).

The searching comprises searching across a plurality of frequency bands supported by the terminal device 110 in response to a first timer expiring (block 225). The searching further comprises searching across a subset of the plurality of frequency bands supported by the terminal device 110 in response to a second timer expiring (block 227).

Other embodiments include a method 300 as shown in the flow diagram of FIG. 5. The method 300 is implemented by a base station 120 in a wireless communication network. The method 300 comprises configuring a terminal device 110 to search for a Home Public Land Mobile Network (HPLMN) 130 each time any of a plurality of timers expires (block 310).

The configuring comprises configuring the terminal device 110 to search across a plurality of frequency bands supported by the terminal device 110 in response to a first timer expiring (block 315). The configuring further comprises configuring the terminal device 110 to search across a subset of the plurality of frequency bands supported by the terminal device 110 in response to a second timer expiring.

In a first example embodiment, a terminal device 110 is configured with a set of HPLMN search timers. Each timer determines a periodicity by which a terminal device 110 searches for its HPLMN 130 over a certain frequency range. As just one non-limiting example, the terminal device 110 may be configured with three timers. In response to expiration of a first search timer, the terminal device 110 is configured to search for the HPLMN 130 across all frequency bands supported by the terminal device 110. In response to expiration of a second search timer, the terminal device 110 is configured to search for the HPLMN across a sub-set of the supported frequency bands. In response to expiration of a third search timer, the terminal device 110 is configured to search for the HPLMN on a subset of just one supported band.

Other embodiments may include any plurality of timers in which the terminal device 110, in response to the expiration of each, is configured to perform a different respective search for the HPLMN 130. Any of the various examples of searches to be performed in response to the expiration of a timer may be included in such embodiments.

In an example embodiment, the terminal device 110 may be limited to searching for the HPLMN 130 in the last known frequency band supported by the HPLMN 130 in response to expiration of a timer. Such embodiments may be intended to minimize or reduce the search time.

In another example embodiment, the HPLMN search is triggered by mobility. Mobility can, e.g., be detected by an accelerometer. The HPLMN search timer T may, in some embodiments, be dependent on mobility, such that a long timer value is used when the terminal device 110 is stationary, and a shorter timer value is used when the terminal device 110 is mobile.

The terminal device 110 may, in some embodiments, be configured to report one or more of its capabilities to the network. In some such embodiments, the use of multiple timers may be associated with a particular terminal device 110 capability, e.g., "Power optimized PLMN selection." Accordingly, in some embodiments, the network only attempts configure terminal devices 110 to use multiple HPLMN search timers as described herein (e.g., via NAS signaling) if the terminal device 110 has reported having this multiple timer capability as described above.

In yet another embodiment, the terminal device 110 may be triggered to change a default set of HPLMN search timers when entering a certain geographic area. For example, in some embodiments, the search periodicities are gradually decreased as a terminal device 110 approaches an area expected to be covered by the terminal device's HPLMN 130.

Alternatively, in some embodiments, a change in geographical area directly triggers the terminal device 110 to perform an HPLMN search. For example, upon return to the factory hall discussed above, the terminal device 110 may be triggered to perform an HPLMN search. To search for the HPLMN 130, the terminal device 110 may be configured to start by attempting to find the HPLMN 130 in the frequency band used last (which may have been previously stored).

In any of the above examples, the change in geographical area may be detected through the use of radio communication technology (e.g., geofencing). In some such embodiments, the terminal device 110 uses one or more short-range technologies such as RFID, Bluetooth Low-energy, etc., to detect corresponding radio transmitters located at entries to the factory hall. Additionally or alternatively, embodiments may include the use of one or more wide-area technologies. For example, the terminal device 110 may be equipped with a wake-up receiver (WUR) and one or more base stations 120a of the HPLMN 130 may periodically broadcast a wake-up signal (WUS). The WUR may enable the terminal device 110 to receive with a minimum of energy consumption. In this regard, the WUR may be a passive receiver that does not require baseband processing, and therefore does not require much power. Accordingly, the terminal device 110 may frequently check whether it has entered an HPLMN area in which the associated WUS is being transmitted. Upon detection of the WUS, the terminal device 110 may be activated and/or triggered to perform an HPLMN search.

In some embodiments, the terminal device 110 is configured to reside in a power saving state when in a VPLMN 140. The power saving state can be, e.g., eDRX, PSM (e.g., as defined in the Long-Term Evolution (LTE) standard), MICO (e.g., as defined in the NR standard). That is, when no HPLMN 130 (or EHPLMN) can be found and the terminal device 110 has therefore selected a VPLMN 140, the terminal device 110 is triggered to enter a power saving state. This could either be explicit (e.g., using existing signaling sent from the terminal device 110 to the network to request eDRX, PSM or MICO), or implicit (e.g., using a new terminal device capability or terminal device-specific configuration for the power saving PLMN selection outlined herein such that it would be known to the network that when such a terminal device 110 goes to a VPLMN 140, a switch to a power saving state would be triggered). In support of one or more of the embodiments discussed herein, detailed parameters could be predefined in a specification, preconfigured, and/or hard-coded. The detection of change in geographical area, as described by any of the embodiments above, may in some embodiments trigger the terminal device 110 to move out of the power saving mode and initiate PLMN selection.

In yet another embodiment, one or more of the timers and/or geographic area configurations are, in full or part, provided by the network. Alternatively, the terminal device 110 may be pre-programmed (e.g., via the SIM card) with one or more of the mentioned configurations.

Although the above embodiments are focused on mobility between HPLMN 130 and VPLMN 140, this should be seen as a non-limiting example. Other embodiments of the present disclosure may include mobility between other types of PLMNs. For example, one or more embodiments may include searching for a particular type of HPLMN (e.g., an EHPLMN) and/or a VPLMN 140. Indeed, other embodiments may include searching and/or selecting any type of PLMN based on multiple timers as discussed above.

Other embodiments include a terminal device 110. The terminal device 110 may perform one, some, or all of the functions described above, depending on the embodiment. In particular, the terminal device 110 may be configured to perform the method 200 illustrated in FIG. 4.

Figure 6:
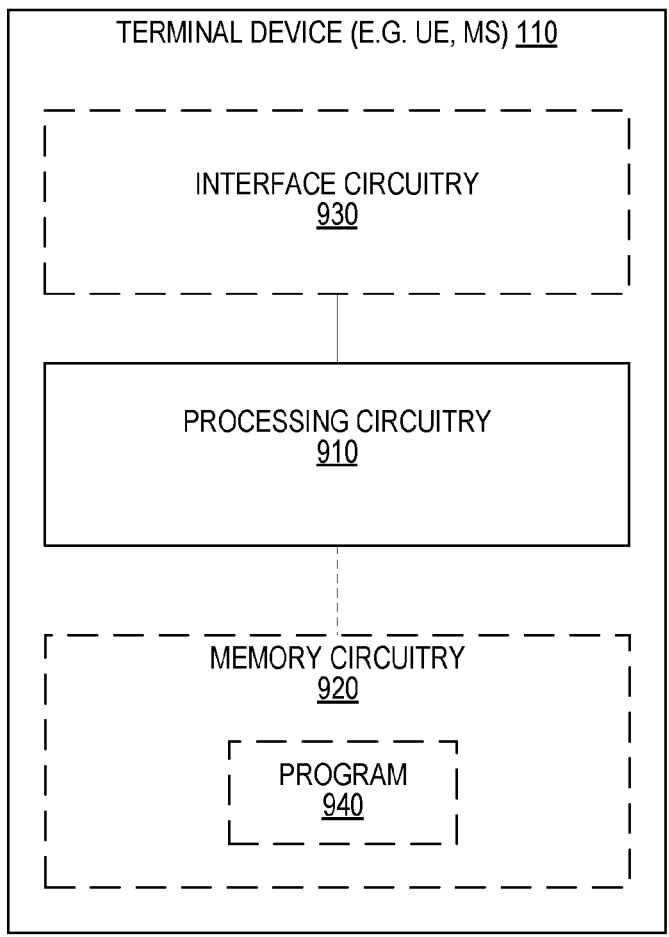
FIG. 6 is a schematic block diagram illustrating an example terminal device, according to one or more embodiments of the present disclosure.

In one example, the terminal device 110 is implemented according to the hardware illustrated in FIG. 6. The example hardware of FIG. 6 comprises processing circuitry 910. In some embodiments, the hardware of the terminal device 110 further comprises memory circuitry 920 and/or interface circuitry 930.

Figure 8:
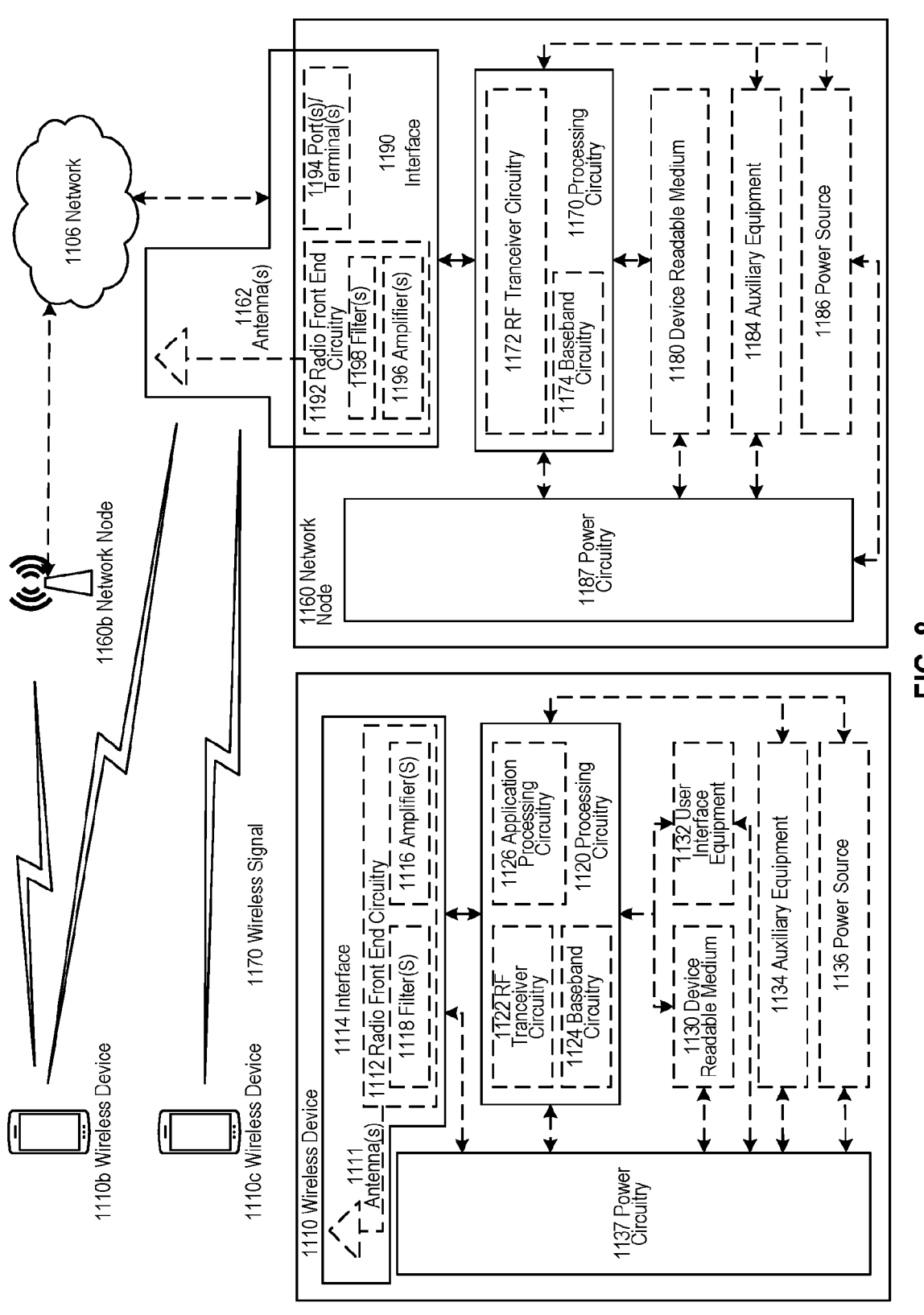
FIG. 8 illustrates an example wireless network, according to one or more embodiments of the present disclosure.

Additionally or alternatively, the base station 120 may be implemented according to the hardware illustrated in FIG. 8. The example hardware of FIG. 8 comprises processing circuitry 810. In some embodiments, the hardware of the base station 120 further comprises memory circuitry 820 and/or interface circuitry 830.

The processing circuitry 910, 810 of either or both devices 110, 120 is communicatively coupled to the memory circuitry 920, 820 and the interface circuitry 930, 830 e.g., via one or more buses. The processing circuitry 910, 810 of either or both devices 110, 120 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910, 810 of either or both devices 110, 120 may comprise a first processing circuit and a second processing circuit that are capable of executing functions in parallel.

The processing circuitry 910, 810 of either or both devices 110, 120 may be programmable hardware capable of executing software instructions stored, e.g., as a machine-readable computer program 940, 840 in the memory circuitry 920,

820, respectively. The memory circuitry 920, 820 of either or both devices 110, 120 may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 930, 830 of either or both devices 110, 120 may be a controller hub configured to control the input and output (I/O) data paths of their respective device 110, 120. Such I/O data paths may include data paths for exchanging signals over a communications network. For example, the interface circuitry 930, 830 may comprise one or more transceivers configured to send and receive communication signals over the air interface of a wireless communication network.

The interface circuitry 930, 830 of either or both devices 110, 120 may be implemented as respective unitary physical components, or as a respective plurality of physical components that are contiguously or separately arranged, any of which may be communicatively coupled to any other, or may communicate with any other via the processing circuitry 910, 810, respectively. For example, the interface circuitry 930, 830 of either or both devices 110, 120 may comprise output circuitry (e.g., transmitter circuitry configured to send communication signals over a wireless communication network) and input circuitry (e.g., receiver circuitry configured to receive communication signals over the wireless communication network). Other examples include other permutations and arrangements of the above and their equivalents.

According to embodiments of the hardware illustrated in FIG. 6, the processing circuitry 910 is configured to perform the method 200 illustrated in FIG. 4. That is, the processing circuitry 910 is configured to connect to a VPLMN 140, and while connected to the VPLMN, search for an HPLMN 130 each time any of a plurality of timers expires. To search, the processing circuitry 910 is configured to search across a plurality of frequency bands supported by the terminal device 110 in response to a first timer expiring, and search across a subset of the plurality of frequency bands supported by the terminal device 110 in response to a second timer expiring.

Figure 7:
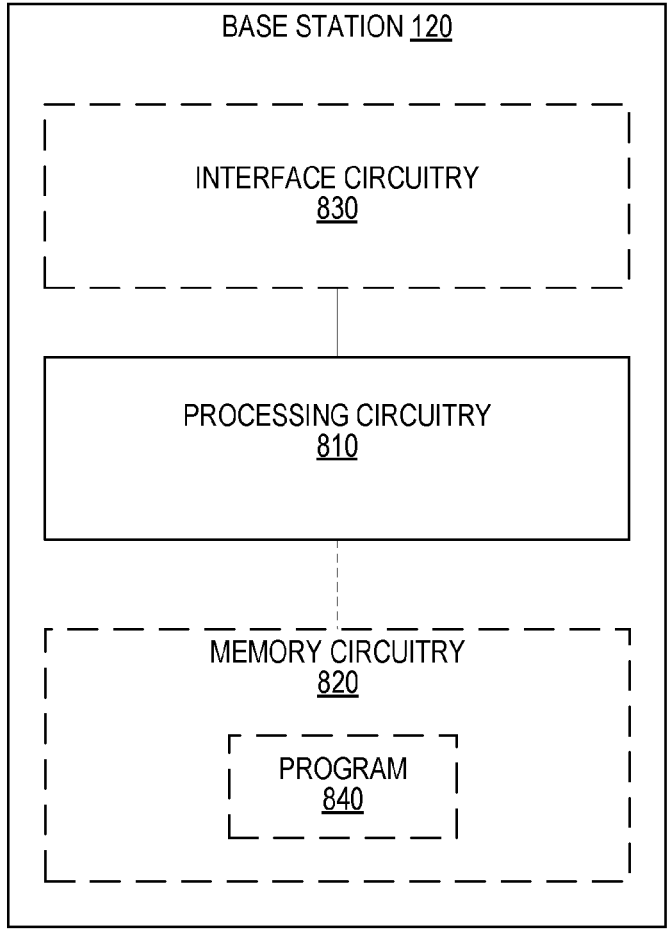
FIG. 7 is a schematic block diagram illustrating an example base station, according to one or more embodiments of the present disclosure.

According to embodiments of the hardware illustrated in FIG. 7, the processing circuitry 810 is configured to perform the method 300 illustrated in FIG. 5. That is, the processing circuitry 810 is configured to configure a terminal device 110 to search for a Home Public Land Mobile Network (HPLMN) 130 each time any of a plurality of timers expires. To configured the terminal device 110 to search, the processing circuitry 810 is configured to configure the terminal device 110 to search across a plurality of frequency bands supported by the terminal device in response to a first timer expiring, and to configure the terminal device 110 to search across a subset of the plurality of frequency bands supported by the terminal device 110 in response to a second timer expiring.

Embodiments of the present disclosure may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Although the subject matter described herein may be implemented in any appropriate type of system using any suitable components, the embodiments disclosed below are described in relation to a wireless network, such as the example wireless network illustrated in FIG. 8. For simplicity, the wireless network of FIG. 8 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 8 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptopembedded equipment (LEE), a laptop-mounted equipment (LME), a smart device, a wireless customer-premise equipment (CPE). a vehicle-mounted wireless terminal device, etc. . . . A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WIMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc.

The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 9:
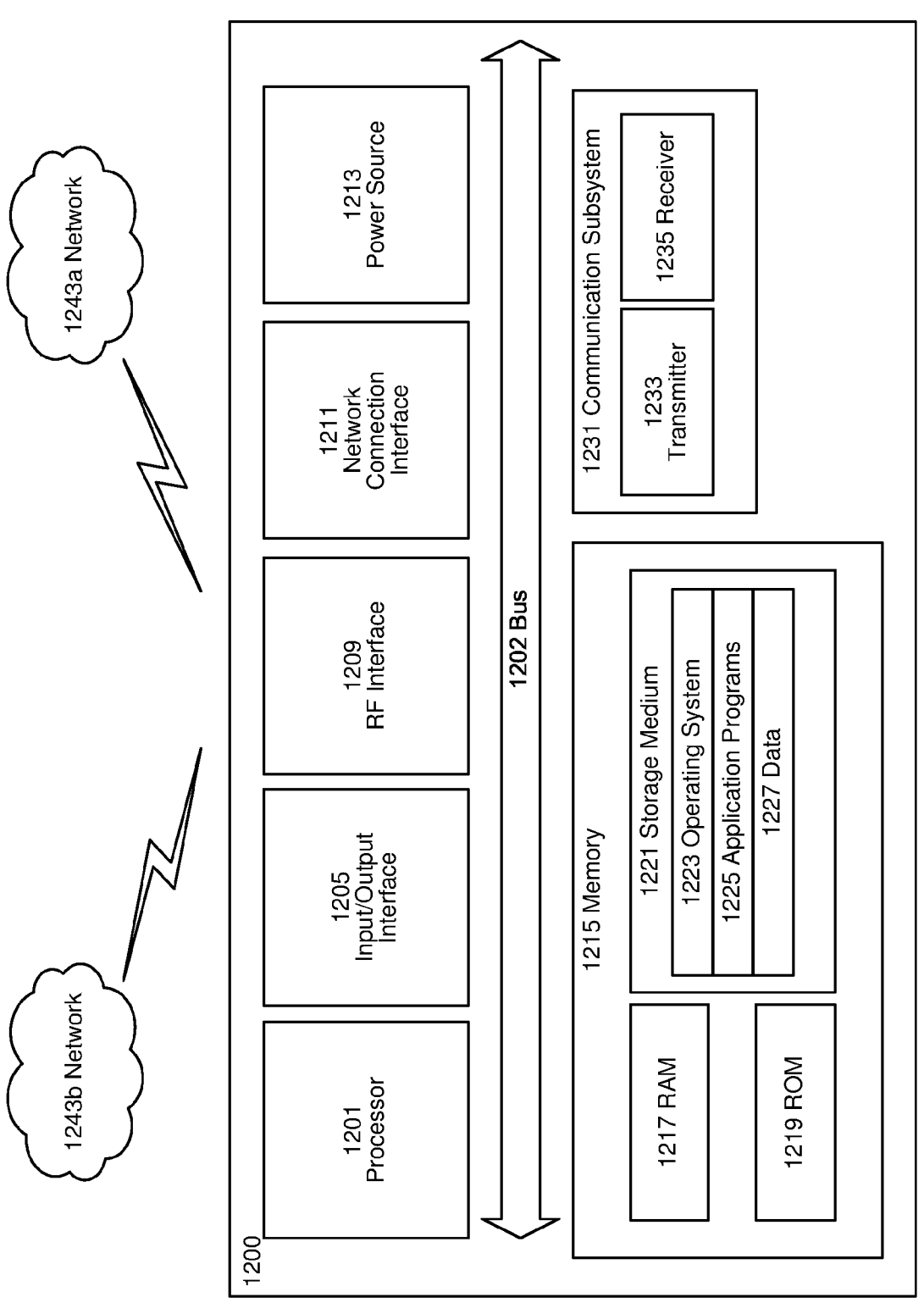
FIG. 9 illustrates an example terminal device, according to one or more embodiments of the present disclosure.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 1201 may be configured to process computer instructions and data. Processing circuitry

1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately. RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 9, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 10:
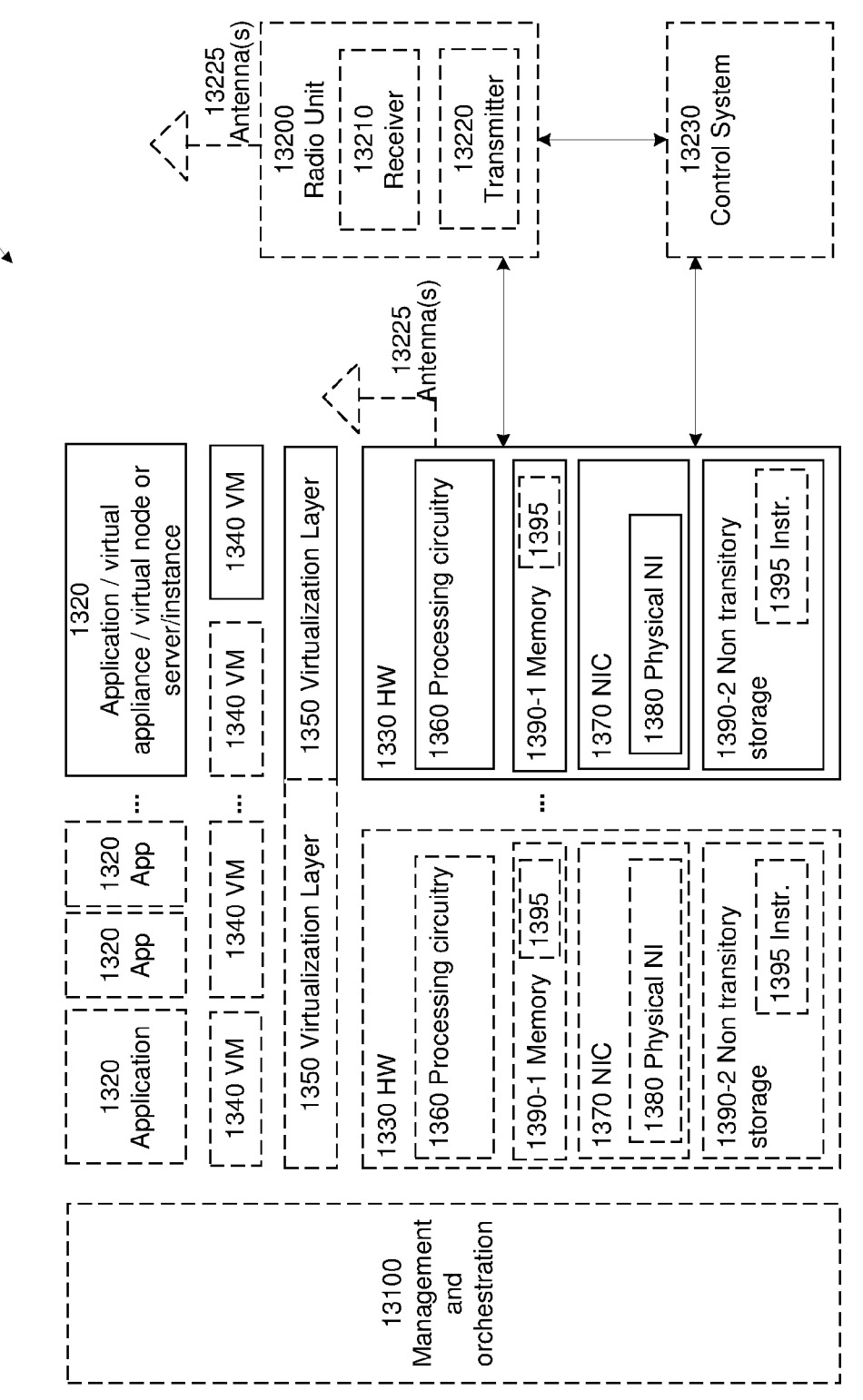
FIG. 10 illustrates an example virtualization environment, according to one or more embodiments of the present disclosure.

FIG. 10 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 10, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 10.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 11:
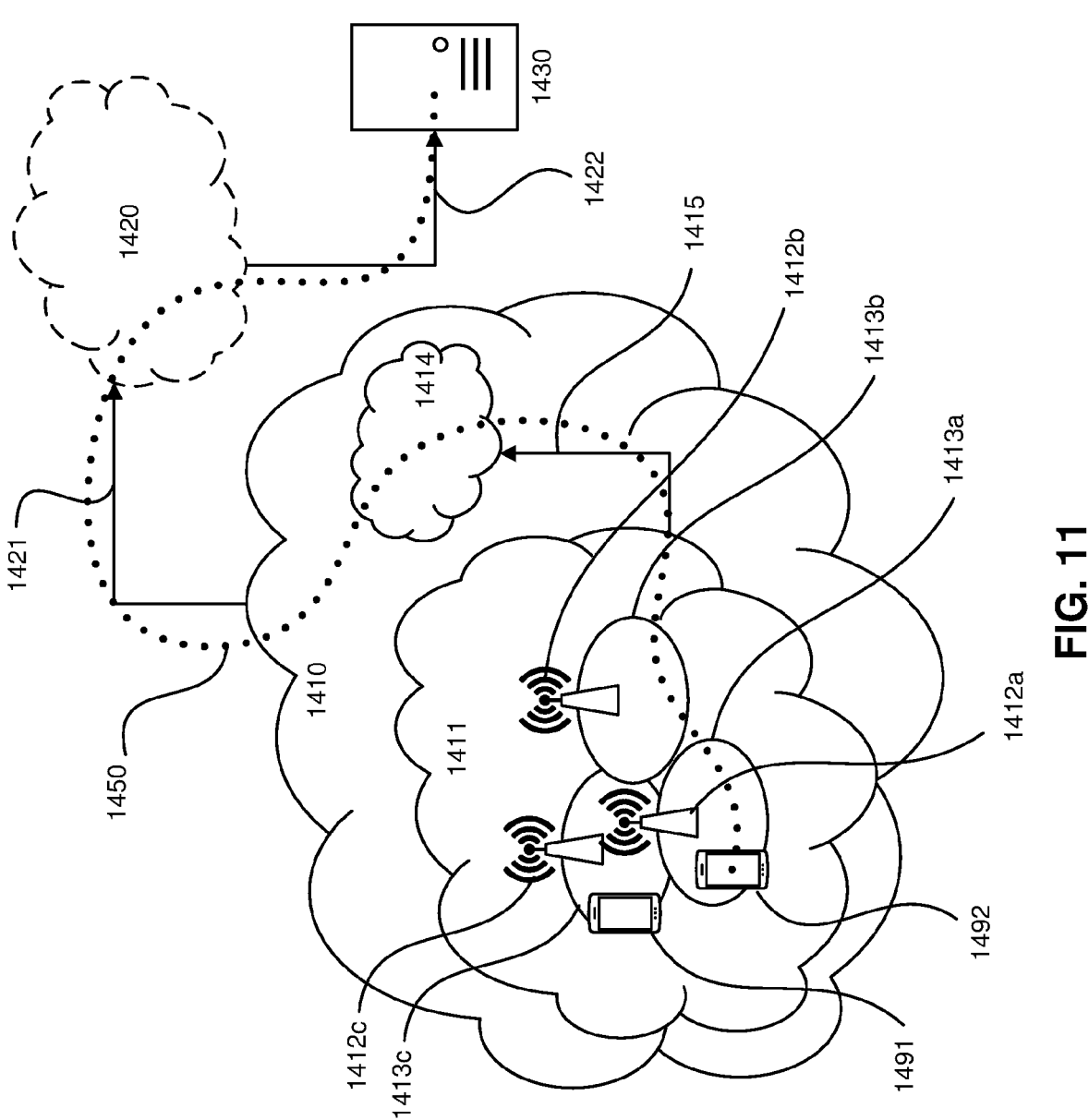
FIG. 11 illustrates an example telecommunication network connected via an intermediate network to a host computer, according to one or more embodiments of the present disclosure.

FIG. 11 illustrates a telecommunication network connected via an intermediate network to a host computer in accordance with some embodiments. In particular, with reference to FIG. 11, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 11 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 12:
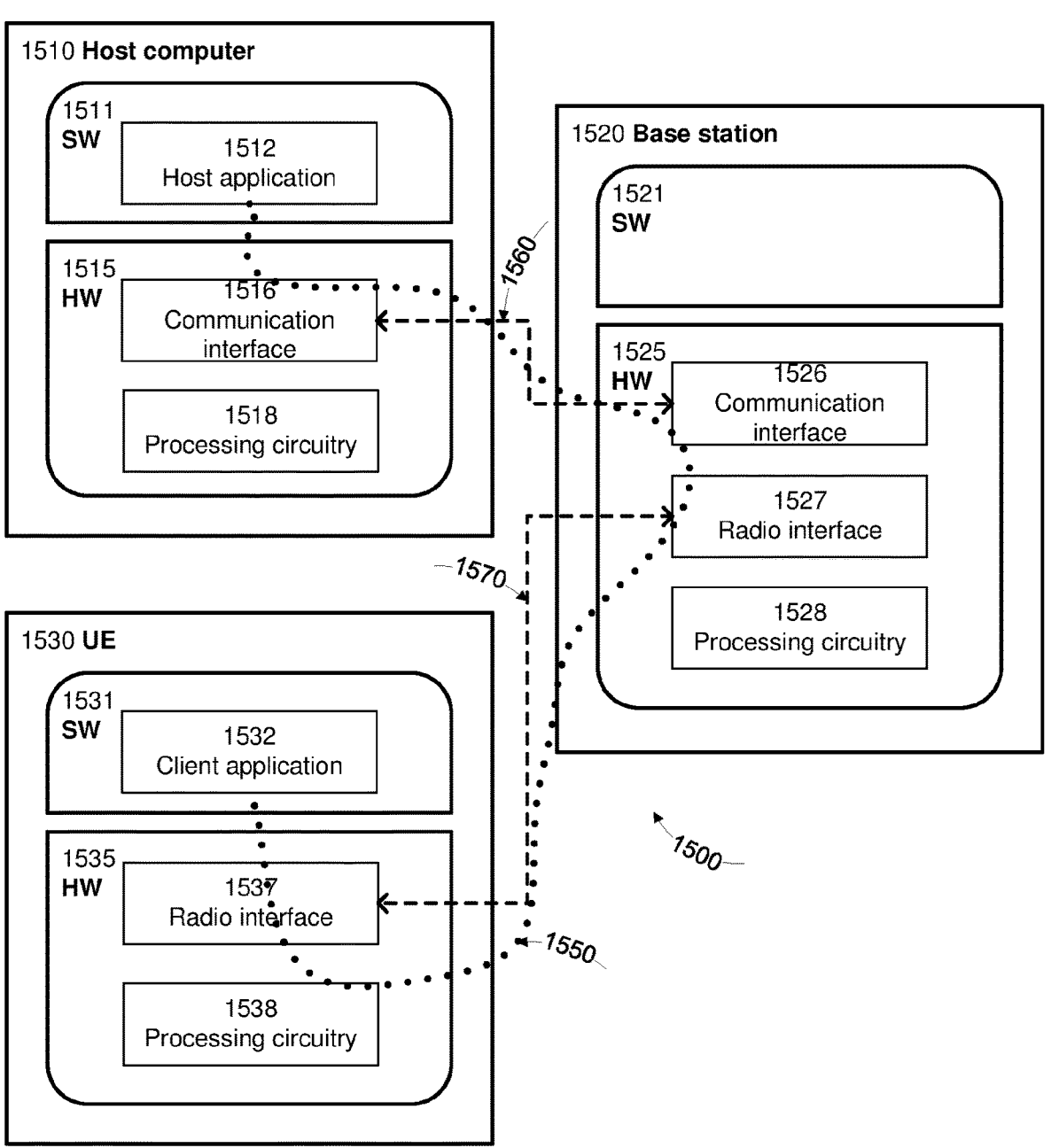
FIG. 12 illustrates an example host computer communicating via a base station with a user equipment over a partially wireless connection, according to one or more embodiments of the present disclosure.

Example implementations, in accordance with an embodiment, of the UE, base station and host computer discussed in the preceding paragraphs will now be described with reference to FIG. 12. FIG. 12 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 12) served by base station 1520. Communication interface 1526 may be configured to facilitate connection 1560 to host computer 1510. Connection 1560 may be direct or it may pass through a core network (not shown in FIG. 12) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application tion 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 12 may be similar or identical to host computer 1430, one of base stations 1412*a*, 1412*b*, 1412*c* and one of UEs 1491, 1492 of FIG. 11, respectively. This is to say, the inner workings of these entities may be as shown in FIG. 12 and independently, the surrounding network topology may be that of FIG. 11.

In FIG. 12, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve power consumption and/or latency resulting from PLMN search and thereby provide benefits such as improved battery life.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 13:
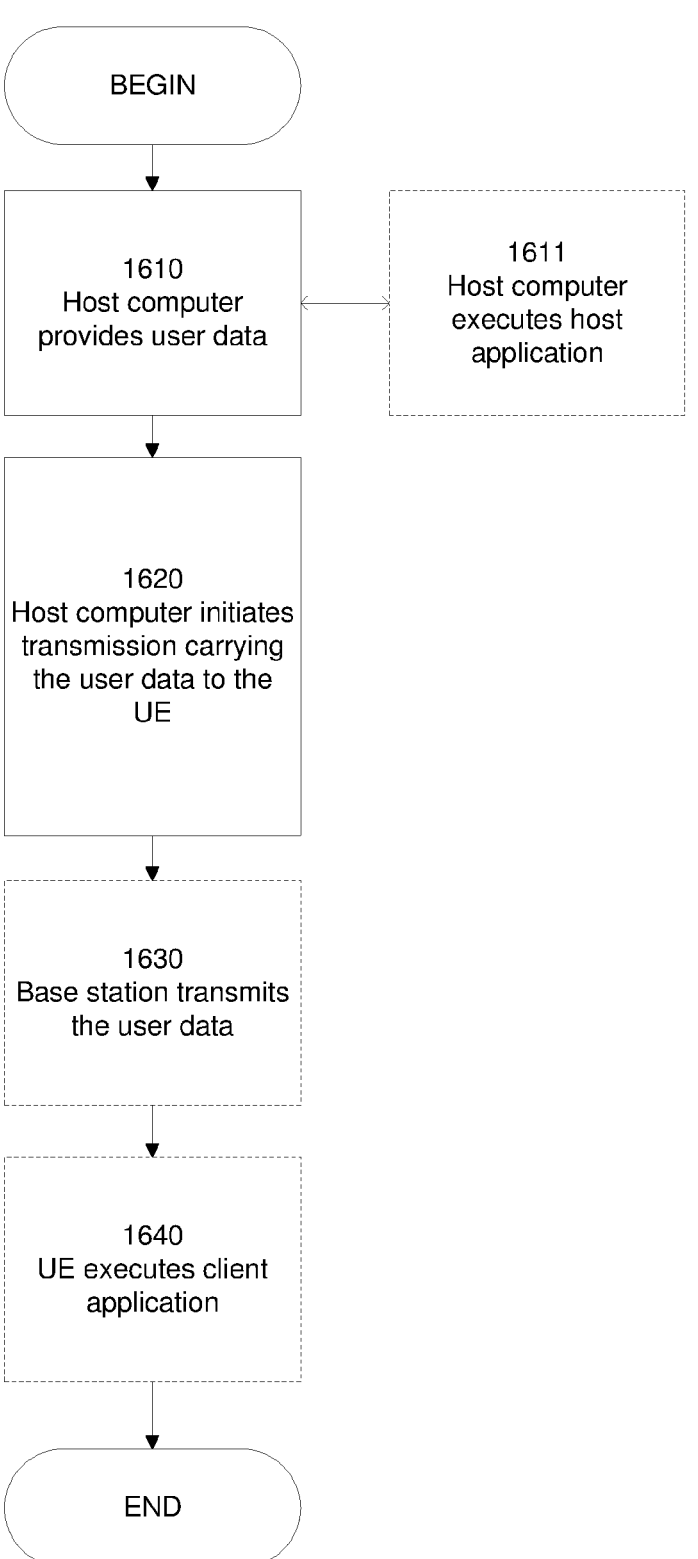
FIGS. 13-16 illustrate example methods implemented in a communication system, according to one or more embodiments of the present disclosure.

FIG. 13 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 13 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 14:
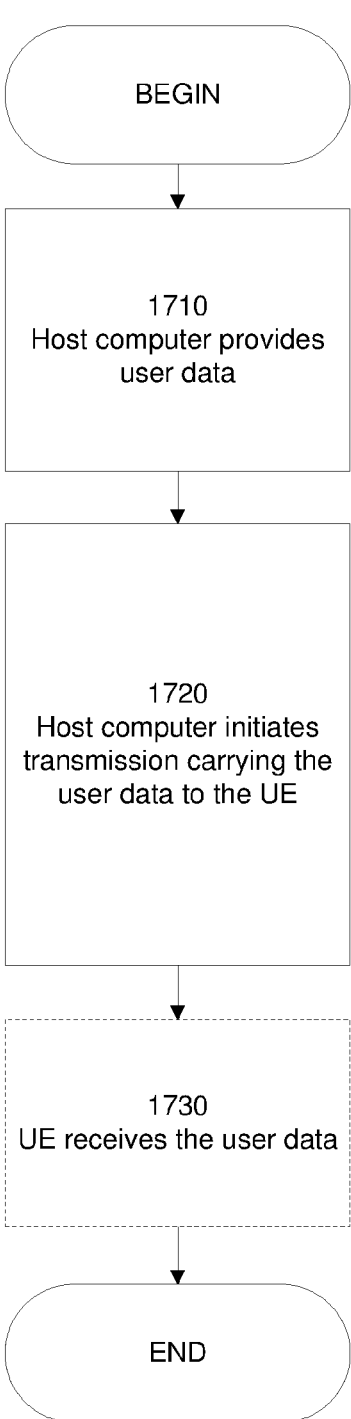

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 15:
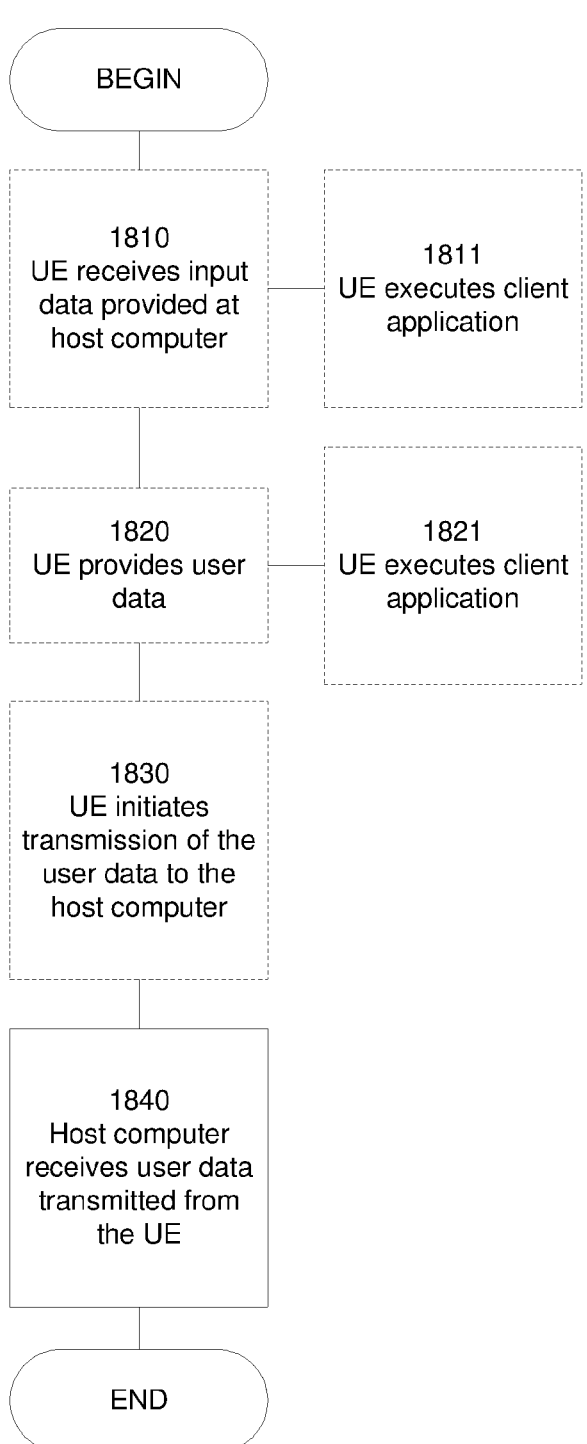

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 16:
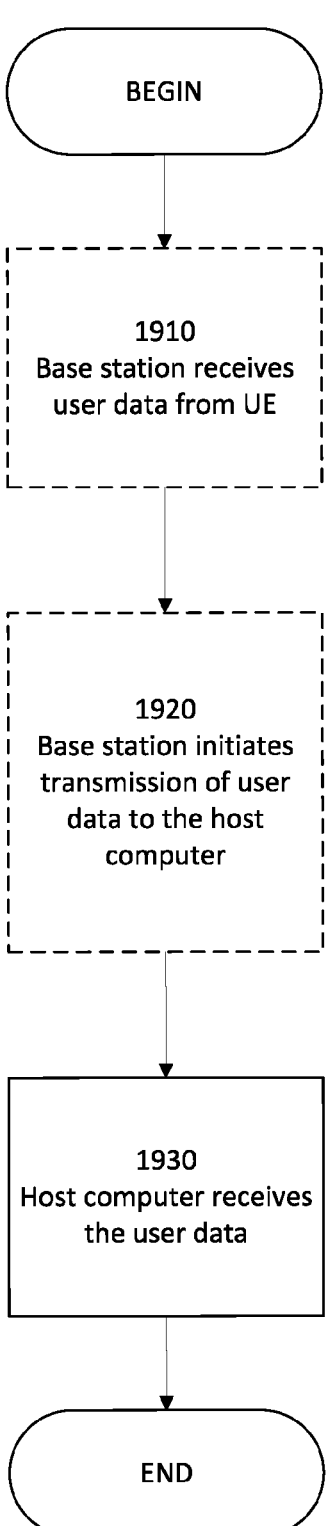

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method, implemented by a terminal device in a wireless communication network, the method comprising:
   connecting to a Visited Public Land Mobile Network (VPLMN); and while connected to the VPLMN, searching for a Home Public Land Mobile Network (HPLMN) each time any of a plurality of timers expires, the searching comprising:

searching across a plurality of frequency bands supported by the terminal device in response to a first timer of the plurality of timers expiring;

searching across a subset of the plurality of frequency bands supported by the terminal device in response to a second timer of the plurality of timers expiring, wherein the subset of the plurality of frequency bands comprises at least two frequency bands; and searching across one of the at least two frequency bands supported by the terminal device in response to a third timer of the plurality of timers expiring, wherein each of the first, second, and third timers are respectively associated with a gradually decreasing frequency band range.

2. The method of claim 1, wherein searching across the one of the at least two frequency bands supported by the terminal device in response to the third timer expiring comprises searching a last known frequency band supported by the HPLMN.

3. The method of claim 1, further comprising adjusting one or more of the first, second, and third timers based on an extent to which the terminal device is mobile.

4. The method of claim 3, wherein adjusting the one or more of the first, second, and third timers based on the extent to which the terminal device is mobile comprises shortening or lengthening at least one of the first, second, and third timers based respectively on whether a mobility of the terminal device has increased or decreased.

5. The method of claim 1, further comprising reporting to the wireless communication network that the searching for the HPLMN using the plurality of timers is supported by the terminal device, and in response, receiving signaling from the wireless communication network configuring the terminal device to enable the searching for the HPLMN using the plurality of timers.

6. The method of claim 1, further comprising adjusting one or more of the first, second, and third timers based on distance from the terminal device to a geographic location.

7. The method of claim 6, wherein adjusting the one or more of the first, second, and third timers based on the distance to the geographic location comprises shortening or lengthening at least one of the first, second, and third timers based respectively on whether the distance from the terminal device to the geographic location has decreased or increased, the geographic location being a location associated with having HPLMN coverage.

8. A terminal device comprising:

processing circuitry and a memory, the memory comprising instructions executable by the processing circuitry whereby the terminal device is configured to:

connect to a Visited Public Land Mobile Network (VPLMN); and while connected to the VPLMN, search for a Home Public Land Mobile Network (HPLMN) each time any of a plurality of timers expires, wherein to search for the HPLMN, the terminal device is configured to:

search across a plurality of frequency bands supported by the terminal device in response to a first timer of the plurality of timers expiring; and search across a subset of the plurality of frequency bands supported by the terminal device in response to a second timer of the plurality of timers expiring, wherein the subset of the plurality of frequency bands comprises at least two frequency bands; and search across one of the at least two frequency bands supported by the terminal device in response to a third timer of the plurality of timers expiring, wherein each of the first, second, and third timers are respectively associated with a gradually decreasing frequency band range.

9. The terminal device of claim 8, wherein to search across the one of the at least two frequency bands supported by the terminal device in response to the third timer of the plurality of timers expiring, the terminal device is configured to search a last known frequency band supported by the HPLMN.

10. The terminal device of claim 8, further configured to adjust one or more of the first, second, and third timers based on an extent to which the terminal device is mobile.

11. The terminal device of claim 8, further configured to report to a wireless communication network that the searching for the HPLMN using the plurality of timers is supported by the terminal device, and in response, receive signaling from the wireless communication network configuring the terminal device to enable the searching for the HPLMN using the plurality of timers.

12. The terminal device of claim 8, further configured to adjust one or more of the first, second, and third timers based on distance from the terminal device to a geographic location.

13. A method, implemented by a base station in a wireless communication network, the method comprising:

configuring a terminal device to search for a Home Public Land Mobile Network (HPLMN) each time any of a plurality of timers expires, the configuring comprising:

configuring the terminal device to search across a plurality of frequency bands supported by the terminal device in response to a first timer of the plurality of timers expiring;

configuring the terminal device to search across a subset of the plurality of frequency bands supported by the terminal device in response to a second timer of the plurality of timers expiring, wherein the subset of the plurality of frequency bands comprises at least two frequency bands; and configuring the terminal device to search across one of the at least two frequency bands supported by the terminal device in response to a third timer of the plurality of timers expiring, wherein each of the first, second, and third timers are respectively associated with a gradually decreasing frequency band range.

14. The method of claim 13, wherein configuring the terminal device to search for the HPLMN each time any of the plurality of timers expires further comprises configuring the terminal device to search for the HPLMN while the terminal device is connected to a Visited Public Land Mobile Network (VPLMN).

15. A base station comprising:

processing circuitry; and a memory comprising instructions executable by the processing circuitry whereby the base station is configured to configure a terminal device to search for a Home Public Land Mobile Network (HPLMN) each time any of a plurality of timers expires, wherein to configure the terminal device the base station is configured to:

configure the terminal device to search across a plurality of frequency bands supported by the terminal device in response to a first timer of the plurality of timers expiring;

configure the terminal device to search across a subset of the plurality of frequency bands supported by the terminal device in response to a second timer of the plurality of timers expiring, wherein the subset of the plurality of frequency bands comprises at least two frequency bands; and configure the terminal device to search across one of the at least two frequency bands supported by the terminal device in response to a third timer of the plurality of timers expiring, wherein each of the first, second, and third timers are respectively associated with a gradually decreasing frequency band range.

16. The base station of claim 15, wherein to configure the terminal device to search for the HPLMN each time any of the plurality of timers expires, the base station is configured to configure the terminal device to search for the HPLMN while the terminal device is connected to a Visited Public Land Mobile Network (VPLMN).

* * * * *